(12) United States Patent
Li et al.

(10) Patent No.: US 9,004,260 B2
(45) Date of Patent: Apr. 14, 2015

(54) FEEDING DEVICE USED IN SURFACE TREATING PROCESS

(71) Applicants: Hong Fu Jin Precision Industry (ShenZhen) Co., Ltd., Shenzhen (CN); Hon Hai Precision Industry Co., Ltd., New Taipei (TW)

(72) Inventors: Bing Li, Shenzhen (CN); Bo Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 71 days.

(21) Appl. No.: 13/954,960

(22) Filed: Jul. 30, 2013

(65) Prior Publication Data
US 2014/0061004 A1    Mar. 6, 2014

(30) Foreign Application Priority Data

Aug. 31, 2012 (CN) .......................... 2012 1 0317813

(51) Int. Cl.
| | |
|---|---|
| *B65G 37/00* | (2006.01) |
| *B65G 35/06* | (2006.01) |
| *C25D 17/06* | (2006.01) |
| *C25D 11/00* | (2006.01) |

(52) U.S. Cl.
CPC ................ *B65G 35/06* (2013.01); *C25D 17/06* (2013.01); *C25D 11/005* (2013.01)

(58) Field of Classification Search
CPC .... B65G 47/52; B65G 47/902; B65G 47/901; B65G 17/22
USPC ................ 198/468.01, 468.2, 468.9, 468.11, 198/860.1, 346.3
See application file for complete search history.

(56) References Cited

U.S. PATENT DOCUMENTS

| 3,051,292 | A | * | 8/1962 | Sundquist et al. ............ 198/429 |
| 4,460,083 | A | * | 7/1984 | Oyama ....................... 198/468.2 |
| 4,629,057 | A | * | 12/1986 | Jensen et al. ............... 198/418.6 |
| 6,170,641 | B1 | * | 1/2001 | Kuster ........................ 198/621.1 |
| 6,702,098 | B2 | * | 3/2004 | Zeibig et al. ............... 198/468.2 |
| 7,344,017 | B1 | * | 3/2008 | Taguchi .................... 198/468.6 |
| 7,578,383 | B2 | * | 8/2009 | Itoh ............................ 198/468.9 |
| 8,757,362 | B2 | * | 6/2014 | Ono et al. ...................... 198/737 |

* cited by examiner

*Primary Examiner* — James R Bidwell
(74) *Attorney, Agent, or Firm* — Novak Druce Connolly Bove + Quigg LLP

(57) ABSTRACT

A feeding device is used for hanging a workpiece on a fixture. The fixture includes two elastic portions. The feeding device includes a base for carrying the workpiece, a mounting seat, a driving member for driving the mounting seat, a guiding assembly, and a driving mechanism mounted on the mounting seat and connected to the guiding assembly for driving the guiding assembly. The guiding assembly passes through the base, and includes first and second guiding members. The driving member is capable of driving the first and second guiding members in the workpiece. The driving mechanism is capable of driving the first and second guiding members move away from each other to a position adjacent the inner walls of the workpiece, and the elastic portions resist against the inner walls of the workpiece, such that the workpiece is hung on the fixture.

18 Claims, 6 Drawing Sheets

FEEDING DEVICE USED IN SURFACE TREATING PROCESS

BACKGROUND

1. Technical Field

The present disclosure relates to feeding devices, and particularly to a feeding device used in a surface treating process, such as an anodizing process.

2. Description of the Related Art

In many surface treating processes, a workpiece is securely hung on a fixture. The fixture includes two elastic clips bent toward each other. In use, the two elastic clips are deformed toward each other by a deforming mechanism, and then are received in the workpiece. After releasing the two elastic clips, the free ends of the two elastic clips resist against opposite inner walls of the workpiece, such that the workpiece is securely hung on the fixture. However, the workpiece is easily scratched by the elastic clips in a hanging process.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
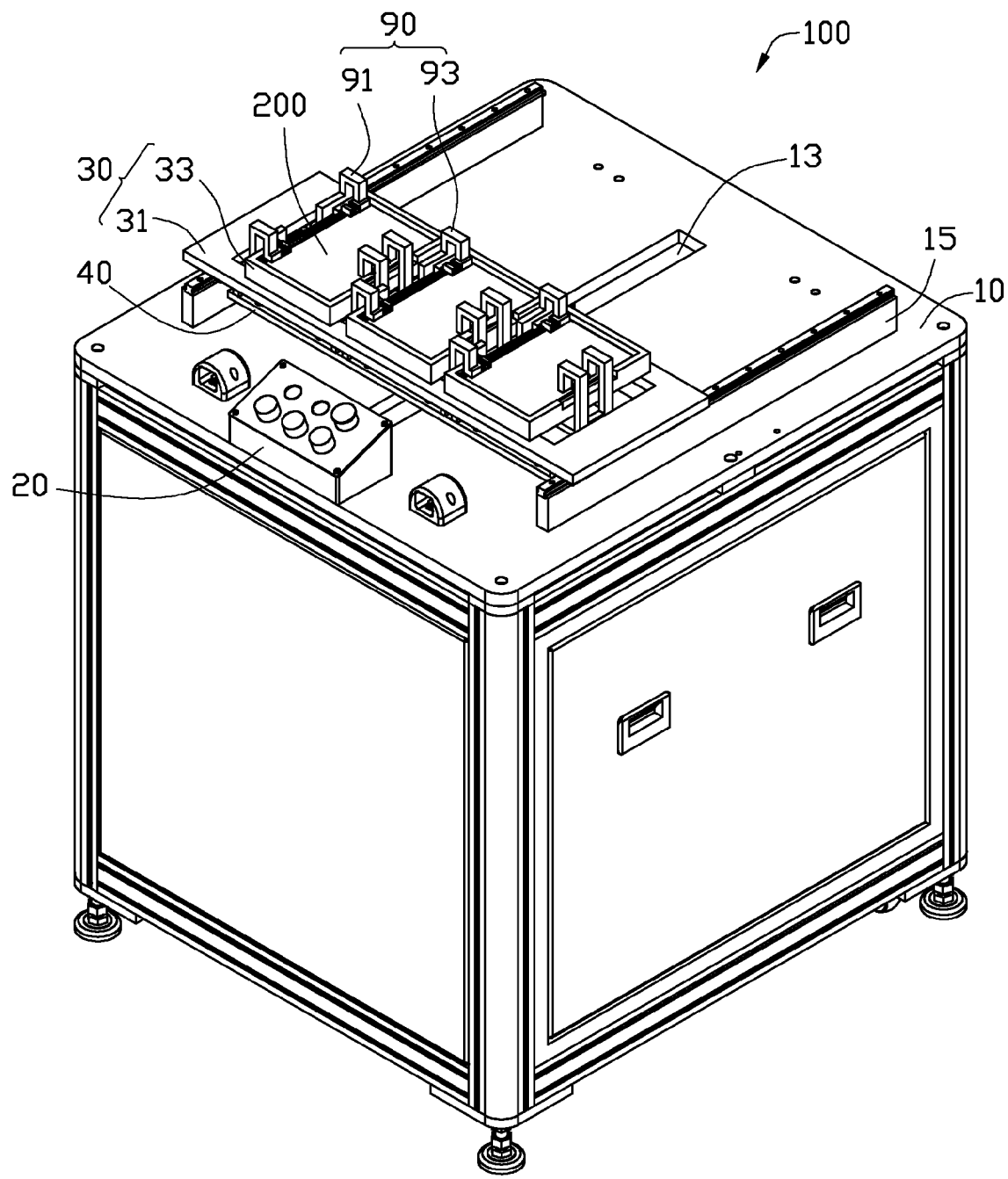
FIG. 1 is an assembled, isometric view of one embodiment of a feeding device.
Figure 2:
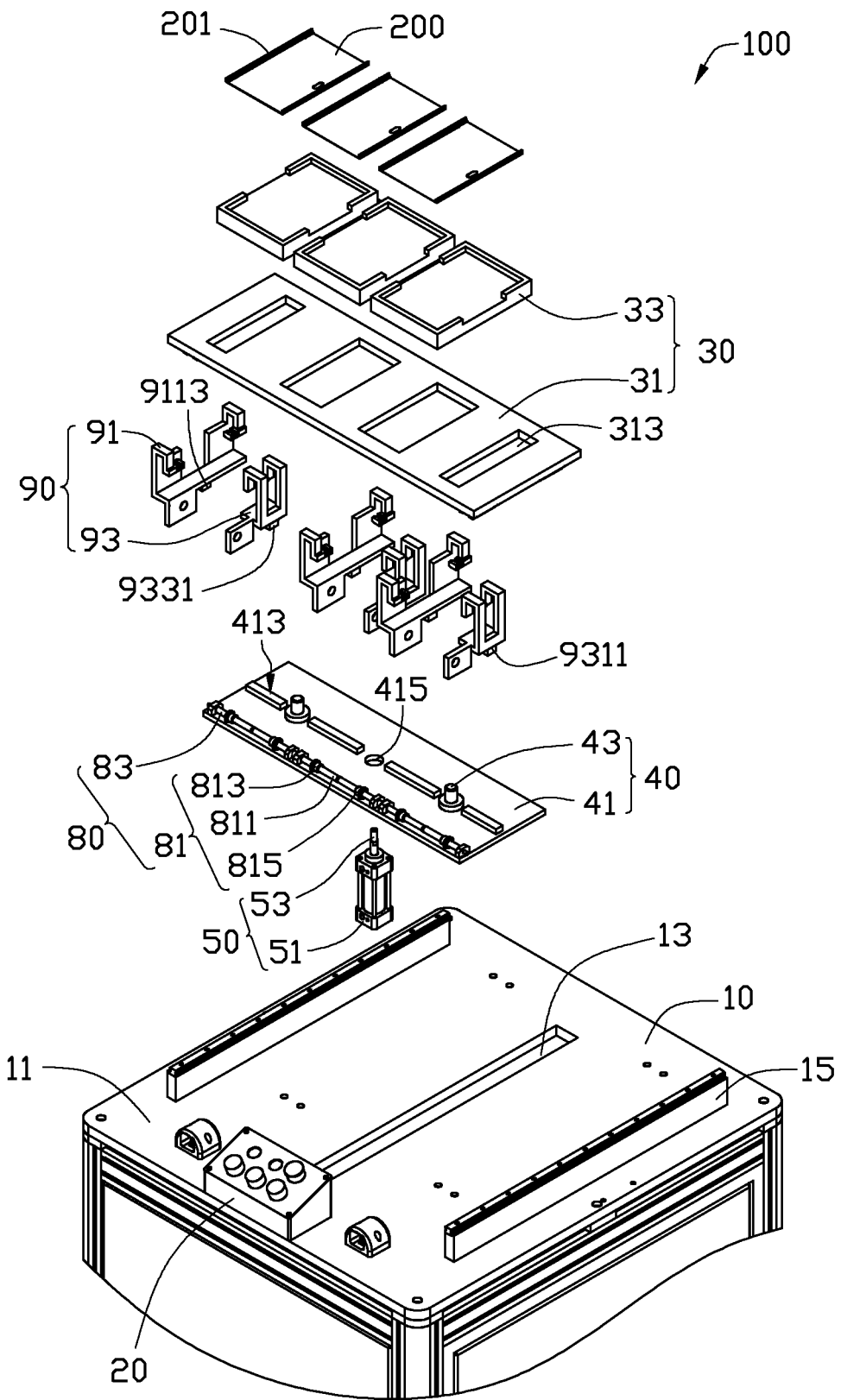
FIG. 2 is a partial, assembled, and isometric view of the feeding device of FIG. 1, the feeding device comprising a guiding assembly.

FIG. 1 shows an embodiment of a feeding device 100 for hanging workpieces 200 on fixtures 300 in an automatic anodizing production line. Referring also to FIG. 2, the feeding device 100 includes a support frame 10, a controller 20, a base 30, a mounting seat 40, a driving member 50, a driving mechanism 80, and three guiding assemblies 90. The controller 20 is mounted on one end of the support frame 10. The base 30 is slidably mounted on the support frame 10, for transporting the workpieces 200. The mounting seat 40 is mounted on the support frame 10 under the base 30, and is movably connected to the base 30. The driving member 50 is mounted on the support frame 10, and is connected to the mounting seat 40 for vertically driving the mounting seat 40. The driving mechanism 80 is mounted on the mounting seat 40 under the base 30. The guiding assemblies 90 are securely connected to the driving mechanism 80, and are horizontally movable, driven by the second driving member 81. The controller 20 is electrically connected to the base 30, the driving member 50, and the driving mechanism 80, for controlling an operation of the feeding device 100.

The support frame 10 is substantially a rectangular housing, and includes a top wall 11 and two rails 15 formed on the top wall 11. A sliding slot 13 is defined in the top wall 11 between the two rails 15. The two rails 15 extend substantially along an extending direction of the sliding slot 13.

The base 30 includes a sliding platform 31 and three trays 33 mounted on the sliding platform 31. Opposite ends of the sliding platform 31 are slidably mounted on the two rails 15. Four mounting holes 313 are defined in the sliding platform 31 spaced from each other. Each tray 33 is substantially frame-like for receiving the workpiece 200. The three trays 33 are securely mounted on the sliding platform 31 next to and spaced from each other. Each tray 33 is positioned above two adjacent mounting holes 313.

The mounting seat 40 includes a mounting plate 41 and two connecting members 43. The mounting plate 41 is rectangular and positioned between the sliding platform 31 and the support frame 10. Four guiding rails 413 are formed on the mounting plate 41 aligned substantially in a straight line corresponding to the four mounting holes 313. A mounting hole 415 is defined in a center of the mounting plate 41 between two of the guiding rails 413. Each connecting member 43 movably connects the mounting plate 41 to the sliding platform 31, such that the mounting plate 41 is movable relative to the sliding platform 31 along the connecting member 43. One connecting member 43 is positioned between two of the guiding rails 413. The other connecting member 43 is positioned between the other two of the guiding rails 413. In the illustrated embodiment, the connecting member 43 is a linear bearing.

The driving member 50 includes a main body 51 and a driving shaft 53 connected to one end of the main body 51. The end of the main body 51 connected to the driving shaft 53 is securely connected to the mounting plate 41. The other end of the main body 51 passes through the sliding slot 13 and received in the support frame 10. The driving shaft 53 passes through the mounting hole 415 and connected to the sliding platform 31, for moving the mounting plate 41 relative to the sliding platform 31. In the illustrated embodiment, the driving member 50 is a cylinder.

The driving mechanism 80 includes three screw rods 81 and a rotation driving member 83. The three screw rods 81 are mounted on an edge of the mounting plate 41 adjacent to the controller 20, and are aligned in a straight line substantially parallel to the first guiding rail 4131. Each screw rod 81 includes a shaft portion 811, a first nut 813 threaded on the shaft portion 811, and a second nut 815 threaded on the shaft portion 811. The rotation driving member 83 is mounted on the mounting plate 41 and connected to the shaft portion 811 of one screw rod 81 adjacent to one of the guiding rails 413 which is adjacent to one end of the mounting plate 41. The rotation driving member 83 is capable of driving the three screw rods 81, such that the first nut 813 and the second nut 815 are driven to move away form each other or toward each other. In the illustrated embodiment, the rotation driving member 83 is a rotating motor.

Figure 3:
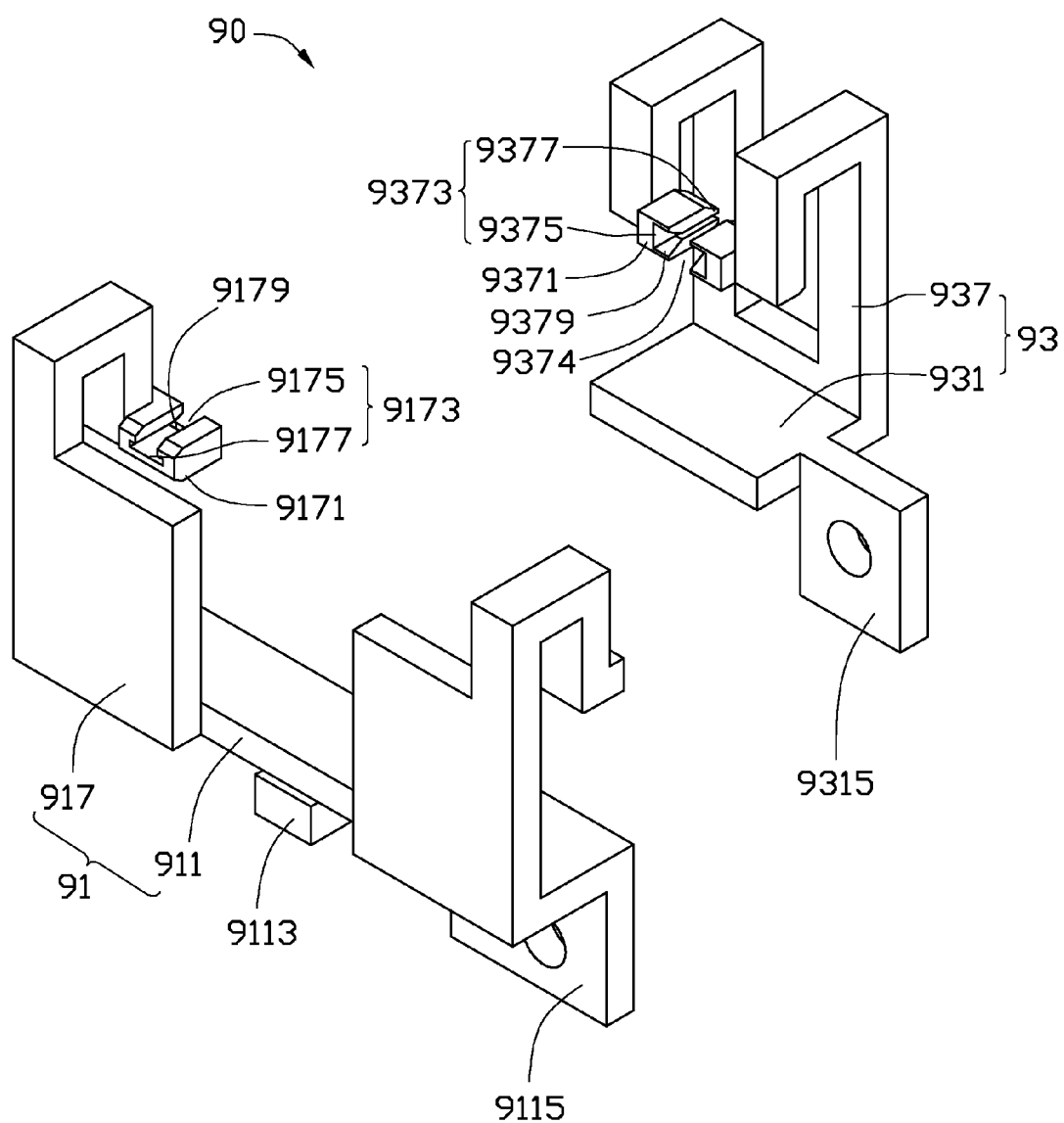
FIG. 3 is an assembled, isometric view of the guiding assembly of FIG. 2.

FIG. 3 shows that the guiding assembly 90 is slidably mounted on the four guiding rails 413. Each guiding assembly 90 includes a first guiding member 91 and a second guiding member 93 facing the first guiding member 91. The first guiding member 91 and the second guiding member 93 are mounted on two adjacent guiding rails 413 of the four guiding rails 413, respectively, and are positioned on opposite sides of one of the trays 33.

The first guiding member 91 includes a first main body 911, two first guiding bodies 917 placed on opposite ends of the first main body 911, a guiding block 9113 formed on a bottom surface of the first main body 911, and a latching block 9115. The first main body 911 is plate-like. The guiding block 9113 of each guiding assembly 90 is respectively slidably connected to three guiding rails 413. The latching block 9115 extends from the first main body 911 away from the guiding bodies 917. The latching block 9115 is latched with the first nut 813, such that the first guiding member 91 is movable along the shaft portion 811 driven by the first nut 813.

The first guiding body 917 includes a first connecting block 9170, a first bent block 9171, and a first guiding block 9172. The first connecting block 9170 is substantially perpendicularly connected to the first main body 911, and passes through the mounting hole 313 protruding out from the sliding platform 31. The first bent block 9171 is substantially L-shaped, and is positioned above the sliding platform 31. One end of the first bent block 9171 is substantially perpendicularly connected to one end of the first connecting block 9170 away from the first main body 911. The other end of the first bent block 9171 extends toward the trays 33. The first guiding block 9172 extends from the other end of the first bent block 9171 and then bends toward the other first bent block 9171. The first guiding block 9172 is placed substantially parallel to a base wall of the tray 33. The first guiding block 9172 defines a first guiding groove 9173 along a direction substantially parallel to the first connecting block 9170. The first guiding groove 9173 includes an inlet 9175 and an outlet 9177 opposite to the inlet 9175. The outlet 9177 is adjacent to an edge of the tray 33. In the illustrated embodiment, the first guiding groove 9173 is a dovetail groove. A guiding surface 9179 is formed on a bottom of the inlet 9175.

The second guiding member 93 includes a second main body 931, two second guiding bodies 937 placed on one side of the second main body 931, a guiding block 9313 placed on a bottom surface of the second main body 931 (referring to FIG. 2), and a latching block 9315 formed on one end of the second main body 931. The guiding block 9313 is slidably connected to one of the guiding rails 413 adjacent to the first guiding member 91. The latching block 9315 is latched with the second nut 815, such that the second guiding member 93 is movable along the shaft portion 811 driven by the second nut 815. Three guiding blocks 9313 of the three guiding assembles 90 are respectively slidably connected to three of the guiding rails 413. The first guiding member 91 and the second guiding member 93 connected to the same one of the guiding rails 413 are placed away from each other.

The second guiding body 937 includes a second connecting block 9370, a second bent block 9371, and a second guiding block 9372. The second connecting block 9370 is connected substantially perpendicularly to the second main body 931, and passes through the mounting hole 313 protruding out from the sliding platform 31. The second bent block 9371 is substantially L-shaped, and is positioned above the sliding platform 31. One end of the second bent block 9371 is connected substantially perpendicularly to one end of the second connecting block away from the second main body 931. The other end of the second bent block 9371 extends toward the trays 33. The second guiding block 9372 extends from one end of the second bent block 9371 away from the second connecting block 9370 and then bends toward the other second connecting block 9370. The two second guiding blocks 9372 are placed facing to each other and substantially parallel to the bottom surface of the trays 33. Each second guiding block 9372 defines a second guiding groove 9373 along a direction substantially perpendicular to the second connecting block 9370. The second guiding groove 9373 includes an inlet 9375 and an outlet 9377 opposite to the inlet 9375. The outlet 9377 is defined adjacent to the edge of the trays 33. A guiding surface 9379 is formed on a bottom of the inlet 9373. Two guiding grooves 9373 of the two second guiding block 9372 cooperatively define a positioning space 9374.

In assembly, the three screw rods 81 and the rotation driving member 83 are mounted on the mounting plate 41, and the rotation driving member 83 is securely connected to the shaft portion 811 of one screw rod 81. The first guiding members 91 and the second guiding members 93 of the three guiding assemblies 90 are slidably connected to the guiding rails 413. The first guiding members 91 are connected to the first nuts 813, and the second guiding members 93 are connected to the second nuts 815. The three trays 33 are mounted on the sliding platforms 31. The mounting plate 41 is movably connected to the sliding platforms 31 by the connecting members 43, and the first guiding bodies 917 and the second guiding bodies 937 of the guiding assembles 90 respectively pass through the corresponding mounting holes 313. The driving member 50 is mounted on the mounting plate 41, and connected to the sliding platform 31. Lastly, the sliding platform 31 is slidably connected to the rails 15, and the main body 51 of the driving member 50 passes through the sliding groove 13.

Figure 4:
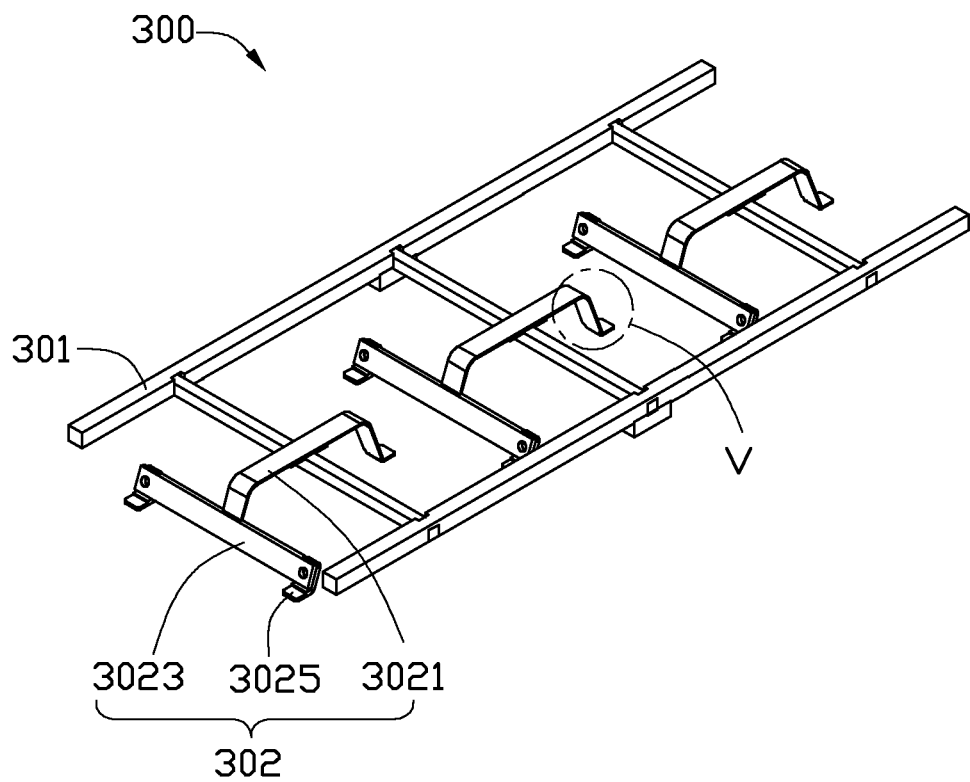
FIG. 4 is an isometric view of a fixture used in the embodiment.
Figure 5:
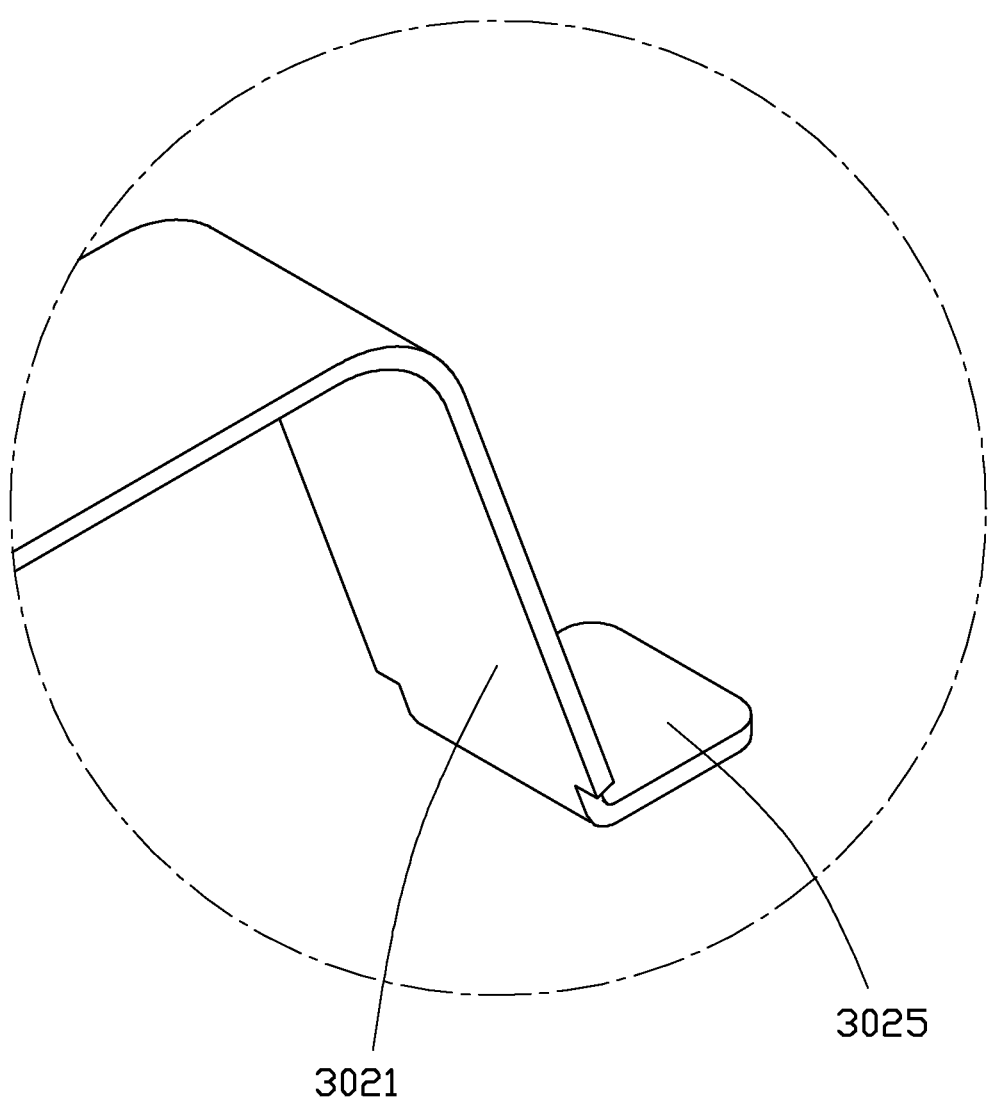
FIG. 5 is a partial, enlarged view of portion V in FIG. 4.

The workpiece 200 is substantially a rectangular shell, and includes opposite inner walls 201. The fixture 300 is connected to a conveying device (not shown). The workpiece 200 is fixed on the fixture 300 by the feeding device 100, and then transported to a workstation for surface treating process. Referring to FIG. 4, the fixture 300 includes a main body 301 and three elastic clamping members 302 mounted on the main body 301. Each clamping member 302 is made of titanium, and welded to the main body 301. The clamping member 302 includes a clamping portion 3021, a connecting portion 3023 connected to one end of the clamping portion 3021, and three elastic portions 3025. Opposite ends of the clamping portion 3021 bend away from the main body 301. The connecting portion 3023 is strip-like, and is substantially perpendicular to the clamping portion 3021. One of the three elastic portions 3025 is formed on a free end of the clamping portion 3021, and the other two of the three elastic portions 3025 are formed on opposite ends of the connecting portion 3023. A shape of each elastic portion 3025 is matched with shapes of the first guiding groove 9173 and the second guiding groove 9373, such that the elastic portion 3025 is movable in the first guiding groove 9173 and the positioning space 9374. A quantity of the elastic portions 3025 can be changed as required. If two elastic portions 3025 are required, the connecting portion 3023 is omitted, the two elastic portions 3025 are formed on opposite ends of the clamping portion 3021, and the first guiding member 91 has the same structure as the second guiding member 93. If four elastic portions 3021 are required, two connecting portions 3023 are formed on opposite ends of the clamping portion 3021, and the second guiding member 93 has the same structure as the first guiding member 91.

Figure 6:
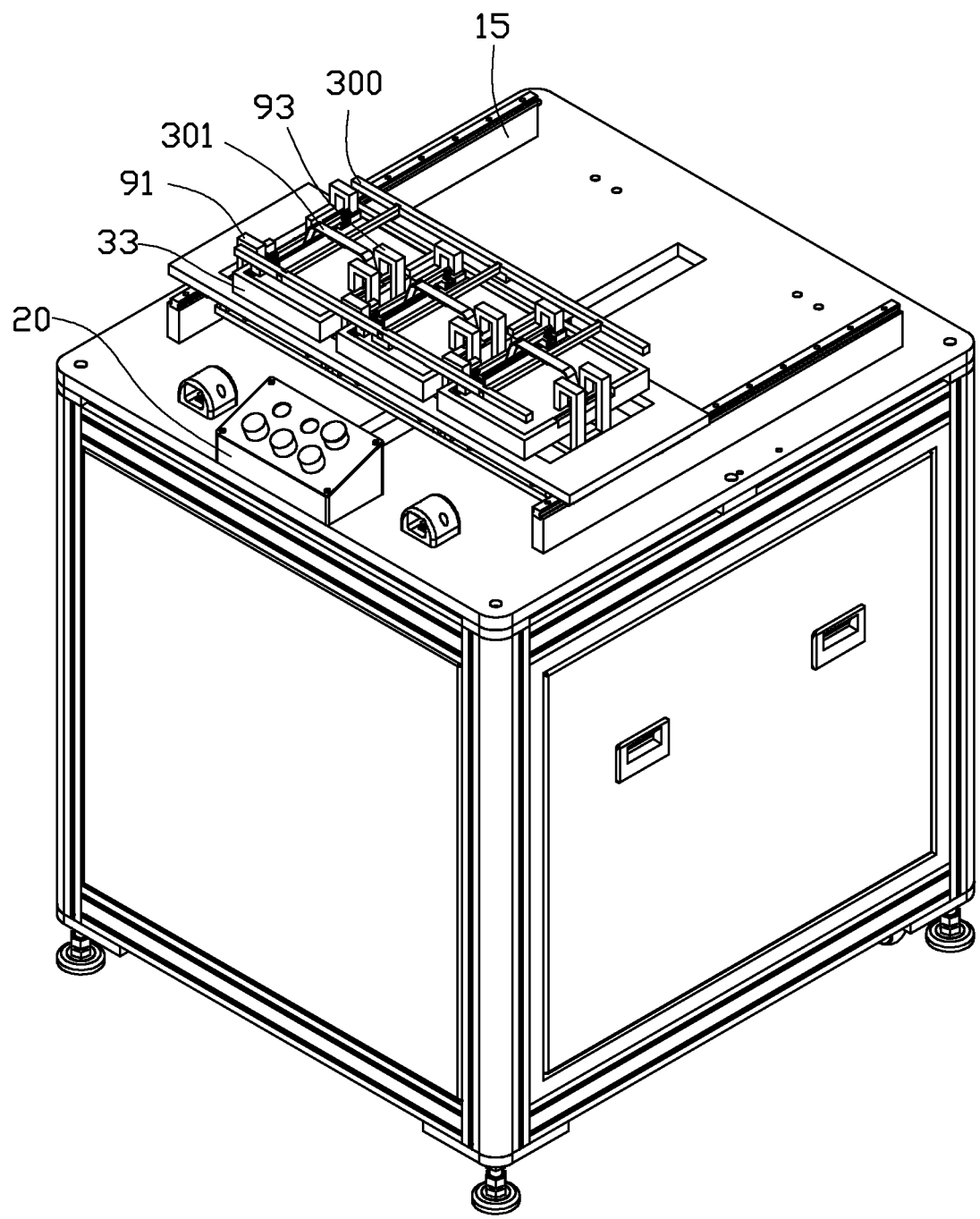
FIG. 6 shows the feeding device of FIG. 1 in a use state.

FIG. 6 shows that in use, the base 30 is driven along the rails 15 to one end of the support frame 10 away from the controller 10 by a driver (not shown), and three workpieces 200 are respectively placed on the three trays 33 by a robot (not shown). The base 30 is driven to a mounting position at the other end of the support frame 10 adjacent to the controller 10. The three screw rods 81 rotate clockwise, and the first guiding member 91 and the second guiding member 93 of the same guiding assembly 90 move toward each other, which is defined as contracting. The mounting plate 41 is driven away from the sliding platform 31 by the driving member 50, such that the first guiding block 9172 and the second guiding block 9372 are moved in the workpiece 200. The screw rods 811 rotate counterclockwise, and the first guiding member 91 and the second guiding member 93 of the same guiding assembly 90 move away from each other, and arrive at a predetermined position relative to the opposite inner walls 201, which is defined as spreading. The fixture 300 is moved above the sliding platform 31, and three clamping members 302 are positioned above the three trays 33. The clamping portion 3021 is deformed by a clamping mechanism (not shown), and one corresponding elastic portion 3025 moves into the first guiding groove 9173. The other two corresponding elastic portions 3025 move into the positioning space 9374. The clamping portion 3021 is then released, and the elastic portions 3021 resist against the inner walls 201 from the outlets 9175, 9377, such that the workpiece 200 is hung on the fixture 300. The first guiding member 91 and the second guiding member 93 is driven toward each other, such that the elastic portions 3021 are detached from the first guiding member 91 and the second guiding member 93. The mounting plate 41 is moved toward the sliding platform 31 driven by the driving member 50, and the first guiding member 91 and the second guiding member 93 is moved to a predetermined position between the fixture 300 and the workpiece 200. The first guiding member 91 and the second guiding member 93 of the same guiding assembly 90 is moved away from each other to the original position, and the fixture 300 with the workpieces 200 is moved away from the trays 33. The sliding platform 31 is moved away from the controller 20 to the other end of the support frame 10. The above processes are repeated to hang the workpieces 200 continually on the fixture 300.

When the fixture 200 clamps the workpiece 200, the elastic portions 3025 pass through the first or second guiding grooves 9173, 9373, and then resist against the inner walls 201 of the workpiece 200 at predetermined resisting positions of the elastic portions 3025. Thus, the workpiece 200 is not easily scratched.

In other embodiments, the base 30 can be securely mounted on the support frame 10. The trays 33 can be omitted, and the workpieces 200 are directly placed on the sliding platform 31. The number of the mounting holes 313 can be changed as required, such as one. The first guiding member 91 and the second guiding member 93 cannot be slidably connected to the mounting plate 41. The screw rods 81 can be replaced by other driving members. For example, the first guiding member 91 and the second guiding member 93 is driven by cylinders. The number of the guiding assembles 90 is at least one, which is same as the number of screw rods 81.

It is to be understood, however, that even through numerous characteristics and advantages of the disclosure have been set forth in the foregoing description, together with details of the structure and function of the embodiments, the disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:

1. A feeding device for hanging a workpiece on a fixture, the workpiece comprising inner walls, the fixture comprising at least two elastic portions, the feeding device comprising:
    a base for carrying the workpiece;
    a mounting seat;
    a driving member driving the mounting seat;
    a guiding assembly passing through the base, and comprising a first guiding member and a second guiding member facing the first guiding member, the first guiding member defining a first guiding groove, the second guiding member defining a second guiding groove; and
    a driving mechanism mounted on the mounting seat and connected to the guiding assembly for driving the guiding assembly, wherein the driving mechanism is capable of driving the first guiding member and the second guiding member toward each other to a position above the workpiece, the driving member is capable of driving the first guiding member and the second guiding member in the workpiece, the driving mechanism is capable of driving the first guiding member and the second guiding member away from each other to a position adjacent the inner walls of the workpiece, and the at least two elastic portions resist against the inner walls of the workpiece via the first guiding groove and the second guiding groove, such that the workpiece is hung on the fixture.

2. The feeding device of claim 1, wherein the first guiding member and the second guiding member are slidably connected to the mounting seat.

3. The feeding device of claim 1, wherein the first guiding groove comprises an inlet and an outlet, and a guiding surface is formed in a bottom of the inlet.

4. The feeding device of claim 1, wherein the guiding assembly comprises at least one screw rod and a rotation driving member, the at least one screw rod comprises a shaft portion, a first nut, and a second nut, the first nut and the second nut are threaded on the shaft portion, the first guiding member is securely connected to the first nut, the second guiding member is securely connected to the second nut, and the rotation driving member is capable of driving the at least one screw rod to rotate.

5. The feeding device of claim 1, wherein the mounting seat comprises a mounting plate and a connecting member, and the connecting member connects the mounting plate to the base.

6. The feeding device of claim 1, wherein the feeding device further comprises a support frame, and the support frame is slidably connected to the base for carrying the workpiece.

7. The feeding device of claim 6, wherein the base comprises a sliding platform and a tray mounting on the sliding platform, the sliding platform is slidably connected to the support frame, the tray is constructed for receiving the workpiece, and the first guiding member and the second guiding member pass through the sliding platform and are positioned on opposite sides of the tray.

8. The feeding device of claim 1, wherein the first guiding member comprises a first main body and two first guiding bodies formed on opposite ends of the first main body, the first main body is slidably connected to the mounting seat, each of the two first guiding bodies comprises a first connecting block, a first bent block, and a first guiding block, the first connecting block is connected to the first main body and protrudes out from the base, the first bent block is formed by bending from one end of the first connecting block away from the first main body, the first guiding block extends from a free end of the first bent block and then bends toward another first bent block of the other first guiding block, and the first guiding groove is defined in the first guiding block.

9. The feeding device of claim 8, wherein the second guiding member comprises a second main body and two second guiding bodies formed on the second main body and spaced from each other, the second main body is slidably connected to the mounting plate, the second guiding body comprises a second connecting block, a second bent block, and a second guiding block, the second connecting block is connected to the second main body and protrudes out from the base, the second bent block is formed by bending from one end of the second connecting block away from the second main body, the second guiding block extends from a free end of the second bent block and then bends toward another second bent block of the other second guiding block, and the second guiding groove is defined in the second guiding block.

10. A feeding device, comprising:
a base;
a mounting seat;
a driving member driving the mounting seat along a first direction substantially perpendicular to the base;
a guiding assembly passing through the base, and comprising a first guiding member and a second guiding member facing the first guiding member, the first guiding member defining a first guiding groove, the second guiding member defining a second guiding groove; and
a driving mechanism mounted on the mounting seat and connected to the guiding assembly for driving the guiding assembly, wherein the first guiding member and the second guiding member are capable of moving toward or away from each other along a second direction substantially perpendicular to the first direction driven by the driving mechanism.

11. The feeding device of claim 10, wherein the first guiding member and the second guiding member are slidably connected to the mounting seat.

12. The feeding device of claim 10, wherein the first guiding groove comprises an inlet and an outlet, and a guiding surface is formed in a bottom of the inlet.

13. The feeding device of claim 10, wherein the guiding assembly comprises at least one screw rod and a rotation driving member, the at least one screw rod comprises a shaft portion, a first nut, and a second nut, the first nut and the second nut are threaded on the shaft portion, the first guiding member is securely connected to the first nut, the second guiding member is securely connected to the second nut, and the rotation driving member is capable of driving the at least one screw rod to rotate.

14. The feeding device of claim 10, wherein the mounting seat comprises a mounting plate and a connecting member, and the connecting member connects the mounting plate to the base.

15. The feeding device of claim 10, wherein the feeding device further comprises a support frame, and the support frame is slidably connected to the base for carrying the workpiece.

16. The feeding device of claim 15, wherein the base comprises a sliding platform and a tray mounting on the sliding platform, the sliding platform is slidably connected to the support frame, the tray is constructed for receiving the workpiece, and the first guiding member and the second guiding member pass through the sliding platform, and are positioned on opposite sides of the tray.

17. The feeding device of claim 10, wherein the first guiding member comprises a first main body and two first guiding bodies formed on opposite ends of the first main body, the first main body is slidably connected to the mounting seat, each of the two first guiding bodies comprises a first connecting block, a first bent block, and a first guiding block, the first connecting block is connected to the first main body and protrudes out from the base, the first bent block is formed by bending from one end of the first connecting block away from the first main body, the first guiding block extends from a free end of the first bent block and then bends toward another first bent block of the other first guiding block, and the first guiding groove is defined in the first guiding block.

18. The feeding device of claim 17, wherein the second guiding member comprises a second main body and two second guiding bodies formed on the second main body and spaced from each other, the second main body is slidably connected to the mounting plate, the second guiding body comprises a second connecting block, a second bent block, and a second guiding block, the second connecting block is connected to the second main body and protrudes out from the base, the second bent block is formed by bending from one end of the second connecting block away from the second main body, the second guiding block extends from a free end of the second bent block and then bends toward another second bent block of the other second guiding block, and the second guiding groove is defined in the second guiding block.

* * * * *